T. E. Rollins,
Converting Motion.
N°. 45,639.  Patented Dec. 27, 1864.
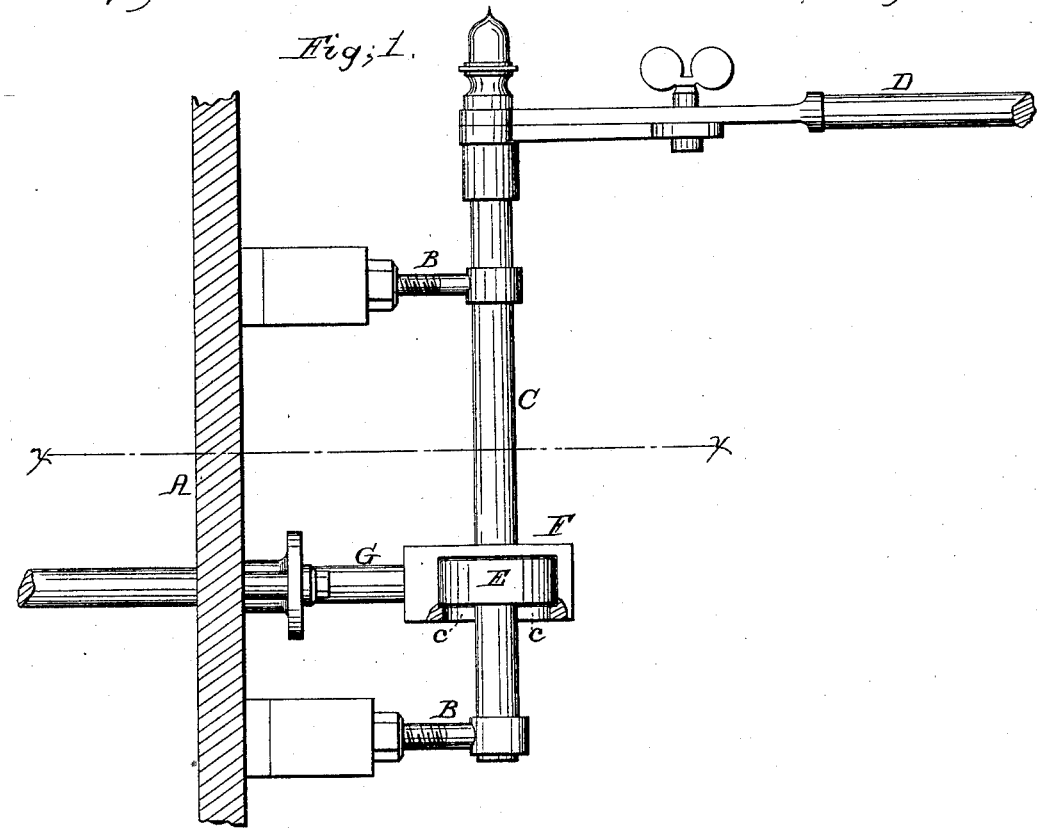
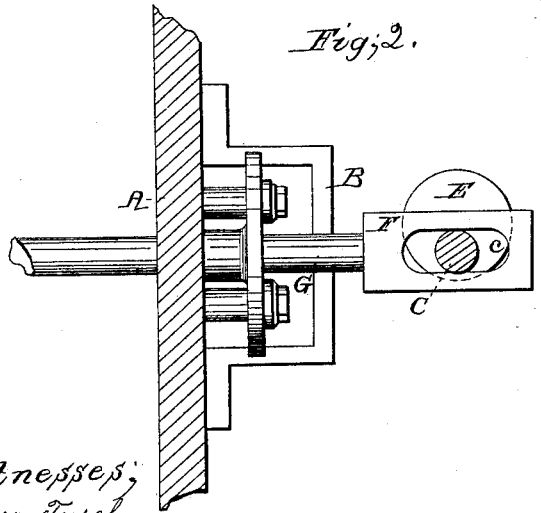
Witnesses;
Theo. Tusch
Henry Morris
Inventor;
T. E. Rollins
per. Munn &
atty

UNITED STATES PATENT OFFICE.

T. E. ROLLINS, OF CORNING, NEW YORK.

IMPROVEMENT IN ECCENTRIC-CAGES.

Specification forming part of Letters Patent No. 45,639, dated December 27, 1864.

*To all whom it may concern:*

Be it known that I, T. E. ROLLINS, of Corning, in the county of Steuben and State of New York, have invented a new and Improved Eccentric-Cage; and I do hereby declare that the following is a full, clear, and exact description thereof, which will enable others skilled in the art to make and use the same, reference being had to the accompanying drawings, forming part of this specification, in which—

Figure 1 represents a side elevation of my invention as applied to the valve-motion of a locomotive-engine. Fig. 2 is a horizontal section of the same, taken in the plane indicated by the line $x\ x$, Fig. 1.

Similar letters of reference indicate like parts.

This invention consists in the application of two guide slots in the sides of an eccentric-cage, to operate in combination with the shaft or stem to which the eccentric is attached, in such a manner that by means of the slots the cage is held in line and prevented from being forced on one side by the action of the eccentric, and the shank or rod to which said cage is attached is preserved against being bent or made to bind in its bearings.

The eccentric-cage which I have represented in the drawings is shown as applied to the valve gear of a locomotive-engine.

A represents the front side of the boiler, to which are securely fastened two arms, B, with loops or eyes, which form the bearings for the vertical rock-shaft C. A handle, D, attached to the upper end of this shaft, and operated by the engineer, serves to open and close the throttle-valve of the engine, and in order to effect this purpose an eccentric disk, E, is mounted on said rock-shaft, and this disk plays in a cage, F, secured to the end of the valve-rod G. This rod extends on the side of the boiler and connects by suitable mechanism with the throttle valve or valves of the engine. These valves are sometimes not well balanced, so that they work hard under pressure, or they are liable to stick, and generally it takes considerable power to move them.

If the engineer pushes on the hand-lever D, therefore, he is liable to move the valve farther than he desires, and the engine is subjected to unnecessary strain, both in stopping and starting a train. This difficulty has been partially overcome by the use of the eccentric E on the rock-shaft C. This eccentric acts on the valve-rod gradually, and it enables the engineer to move the valve in either direction with little exertion exactly to the spot where he wants it. By the action of the eccentric, however, the valve-rod is subjected to a lateral strain, as well as to a strain in a longitudinal direction, and by this lateral strain said rod is liable to be bent or made to bind in its bearings and to work hard. These disadvantages are overcome by the use of my cage F, which is provided with a slot, $c$, in its top and bottom, or in those sides through which the rock-shaft passes. These slots are long enough to allow the requisite longitudinal motion of the valve-rod, but laterally they fit closely to the shaft, and the valve-rod is relieved from all lateral strain.

It is obvious that this eccentric cage can be applied with the same result to eccentrics in any other position, and performing any other function besides that above described. It takes the place of the ordinary eccentric-ring, generally used to convert the rotary motion of the eccentric into a reciprocating or oscillating motion, and it will be readily seen that the friction of my cage is much less than that of the ring, which embraces the eccentric disk and is dropped between flanges, which still further increase the friction or its liability to bind.

I claim as new and desire to secure by Letters Patent—

The application of slots $c$ in the sides of the cage G, to operate in combination with the shaft C and the eccentric disk E, in the manner and for the purpose substantially as set forth.

T. E. ROLLINS.

Witnesses:
J. D. QUACKENBUSH.
JOHN ROSE.